(12) United States Patent
Li et al.

(10) Patent No.: US 11,235,767 B2
(45) Date of Patent: Feb. 1, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Mingmei Li, Wako (JP); Yuji Yasui, Wako (JP); Tokitomo Ariyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 310 days.

(21) Appl. No.: 16/436,962

(22) Filed: Jun. 11, 2019

(65) Prior Publication Data

US 2019/0382013 A1    Dec. 19, 2019

(30) Foreign Application Priority Data

Jun. 13, 2018 (JP) .............................. JP2018-113051

(51) Int. Cl.
*B60W 30/18* (2012.01)
*B60W 10/20* (2006.01)
*B60W 10/04* (2006.01)

(52) U.S. Cl.
CPC ............ *B60W 30/18* (2013.01); *B60W 10/04* (2013.01); *B60W 10/20* (2013.01); *B60W 2554/00* (2020.02); *B60W 2710/20* (2013.01); *B60W 2720/106* (2013.01)

(58) Field of Classification Search
CPC ...... B60W 30/18; B60W 10/20; B60W 10/04; B60W 2554/00; B60W 2710/20; B60W 2720/106; B60W 60/0017; B60W 2554/4026; B60W 2554/4029; B60W 50/14; B60W 2420/42; B60W 2050/146; B60W 2554/80; B60W 2554/402; B60W 30/095; B60W 30/09

See application file for complete search history.

(56) References Cited

U.S. PATENT DOCUMENTS 9,511,767 B1 * 12/2016 Okumura .......... B60W 50/0097

FOREIGN PATENT DOCUMENTS

JP          2011-096105        5/2011

* cited by examiner

*Primary Examiner* — Alan D Hutchinson
(74) *Attorney, Agent, or Firm* — Amin, Turocy & Watson, LLP

(57) ABSTRACT

A vehicle control device includes: a peripheral situation recognition unit (132) configured to recognize a peripheral situation of an automatic driving vehicle; a driving control unit (140, 160, (138)) configured to control one or both of steering and an acceleration or deceleration speed of the vehicle based on the peripheral situation recognized by the peripheral situation recognition unit; and a potential risk estimation unit (138) configured to estimate presence or absence and classification of a potential risk meeting with an obstacle based on classification of a target recognized by the peripheral situation recognition unit and a positional relation between the vehicle and the target. The driving control unit performs the driving control based on an estimation result of the potential risk estimation unit.

8 Claims, 13 Drawing Sheets

| 20XX/12/12 8:00:00 | OWN VEHICLE | OTHER VEHICLES | BUS | BICYCLE | PEDESTRIAN | INTERSECTION STOP LINE | CROSS-WALK | TRAFFIC SIGNAL | TRAFFIC SIGN |
|---|---|---|---|---|---|---|---|---|---|
| PARKING OR STOPPING/DRIVING | | | | | | | | | |
| FOOTWAY | | | | | | | | | |
| SIDE STRIP | 0.75[m] | | | | | | | | |
| MEDIAN LINE | | | | | | | | | |
| TRAVEL LANE R0 | | | | | | 1*20[m] | | | |
| TRAVEL LANE R1 | | | | | | 1*20[m] | | | |
| TRAVEL LANE R2 | 1 | 1*5[m] | | | | 1*20[m] | | | |
| TRAVEL LANE R2 | 1 | 1*15[m] | | | | 1*20[m] | | | |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-113051, filed Jun. 13, 2018, the content of which is incorporated herein by reference.

BACKGROUND

Field of the Invention

The present invention relates to a vehicle control device, a vehicle control method, and a storage medium.

Description of Related Art

In the related art, a driving support technology for considering the risk of contact between an obstacle near an own vehicle and the own vehicle and supplying normative action candidates for avoiding the contact risk to a drivers of the own vehicle is disclosed (for example, see Japanese Unexamined Patent Application, First Publication No. 2011-96105). In the technology disclosed in Japanese Unexamined Patent Application, First Publication No. 2011-96105, normative action candidates are supplied by estimating the short-term risk and long-term risk of contacts between an obstacle and an own vehicle based on a current route which is a route of an obstacle object which can be directly recognized and a potential route which is a route of the obstacle of which presence is expected.

SUMMARY

In the technology of the related art, however, a reduction in a calculation amount by reducing necessity of estimation of long-term risk and focusing on estimation of a short-term risk can be considered, but a reduction in a process load of the short-term risk is not particularly considered.

The present invention is devised in view of such circumstances and one object of the present invention is to provide a vehicle control device, a vehicle control method, and a storage medium capable of estimating a potential risk related to an obstacle which is near an own vehicle.

The vehicle control system, the vehicle control method, and the program according to aspects of the present invention adopt the following configurations.

(1) According to an aspect of the present invention, there is provided a vehicle control device including: a peripheral situation recognition unit configured to recognize a peripheral situation of a vehicle; a driving control unit configured to control one or both of steering and an acceleration or deceleration speed of the vehicle based on the peripheral situation recognized by the peripheral situation recognition unit; and a potential risk estimation unit configured to estimate presence or absence and classification of a potential risk meeting with an obstacle based on classification of a target recognized by the peripheral situation recognition unit and a positional relation between the vehicle and the target. The driving control unit performs the driving control based on an estimation result of the potential risk estimation unit.

(2) In the foregoing (1) aspect, the vehicle control device may further include a traffic scenario storage unit configured to store the classification of the potential risk included in the estimation result of the potential risk estimation unit by the potential risk estimation unit as a keyword indicating a feature of the estimation result.

(3) In the foregoing (2) aspect, the potential risk estimation unit may estimate the presence or absence and the classification of the potential risk by generating the keyword indicating the feature of the estimated potential risk and searching for the estimation result stored in the traffic scenario storage unit by the keyword.

(4) In the foregoing (1) aspect, the vehicle control device may further include a risk analysis unit configured to compare a potential risk value obtained by digitizing a potential risk of the peripheral situation of the vehicle with a risk value obtained by digitizing a potential risk of the peripheral situation of the vehicle recognized by the peripheral situation recognition unit, output a peripheral situation of the vehicle in which the potential risk is considered to the driving control unit when the potential risk value is equal to or greater than the risk value, and output the peripheral situation of the vehicle recognized by the peripheral situation recognition unit to the driving control unit when the potential risk value is less than the risk value.

(5) In the foregoing (4) aspect, the risk analysis unit may reproduce the peripheral situation of the vehicle in which the potential risk is considered by composing image information related to the potential risk with a recognition result recognized by the peripheral situation recognition unit for display.

(6) In the foregoing (4) aspect, the risk analysis unit may reproduce the peripheral situation of the vehicle in which the potential risk is considered by plotting an event indicating an estimation result recognized by the peripheral situation recognition unit in a recognition space.

(7) According to another aspect of the present invention, there is provided a vehicle control device including: a peripheral situation recognition unit configured to recognize a peripheral situation of a vehicle; a potential risk estimation unit configured to estimate a potential risk meeting with an obstacle based on a peripheral situation recognized by the peripheral situation recognition unit; and a driving control unit configured to compare a potential risk value obtained by digitizing the estimated potential risk with a risk value obtained by digitizing a potential risk of the peripheral situation of the vehicle recognized by the peripheral situation recognition unit, perform driving control in which the potential risk is considered when the potential risk value is equal to or greater than the risk value, and perform driving control based on the peripheral situation of the vehicle recognized by the peripheral situation recognition unit when the potential risk value is less than the risk value.

(8) According to still another aspect of the present invention, there is provided a vehicle control method for causing a computer to perform: recognizing a peripheral situation of a vehicle; performing driving control to control one or both of steering and an acceleration or deceleration speed of the vehicle based on the recognized peripheral situation; and estimating presence or absence and classification of a potential risk meeting with an obstacle based on classification of a recognized target and a positional relation between the vehicle and the target and performing the driving control based on an estimation result.

(9) According to still another aspect of the present invention, there is provided a storage medium storing a program causing a computer to perform: recognizing a peripheral situation of a vehicle; performing driving control to control one or both of steering and an acceleration or deceleration speed of the vehicle based on the recognized peripheral situation; and estimating presence or absence and classification of a potential risk meeting with an obstacle based on classification of a recognized target and a positional relation between the vehicle and the target and performing the driving control based on an estimation result.

According to the (1) to (9) aspects, by selecting an event with a high potential risk in the case of occurrence and performing a process of a short-term risk, it is possible to reduce a process load.

According to the (3) aspect, by using a general technology for searching for the estimation result stored in the traffic scenario storage unit by the keyword, it is possible to reduce a software development load.

According to the (4) to (7) aspects, by composing image information related to the potential risk with a recognition result recognized by the peripheral situation recognition unit, it is possible to perform a process of calculating a short-term risk with higher precision.

BRIEF DESCRIPTION OF THE DRAWINGS

FIG. 4 is a diagram illustrating an example of a table stored in a peripheral situation storage unit.

DETAILED DESCRIPTION OF THE INVENTION

Hereinafter, embodiments of a vehicle control device, a vehicle control method, and a storage medium according to the present invention will be described with reference to the drawings.

[Overall Configuration]

Figure 1:
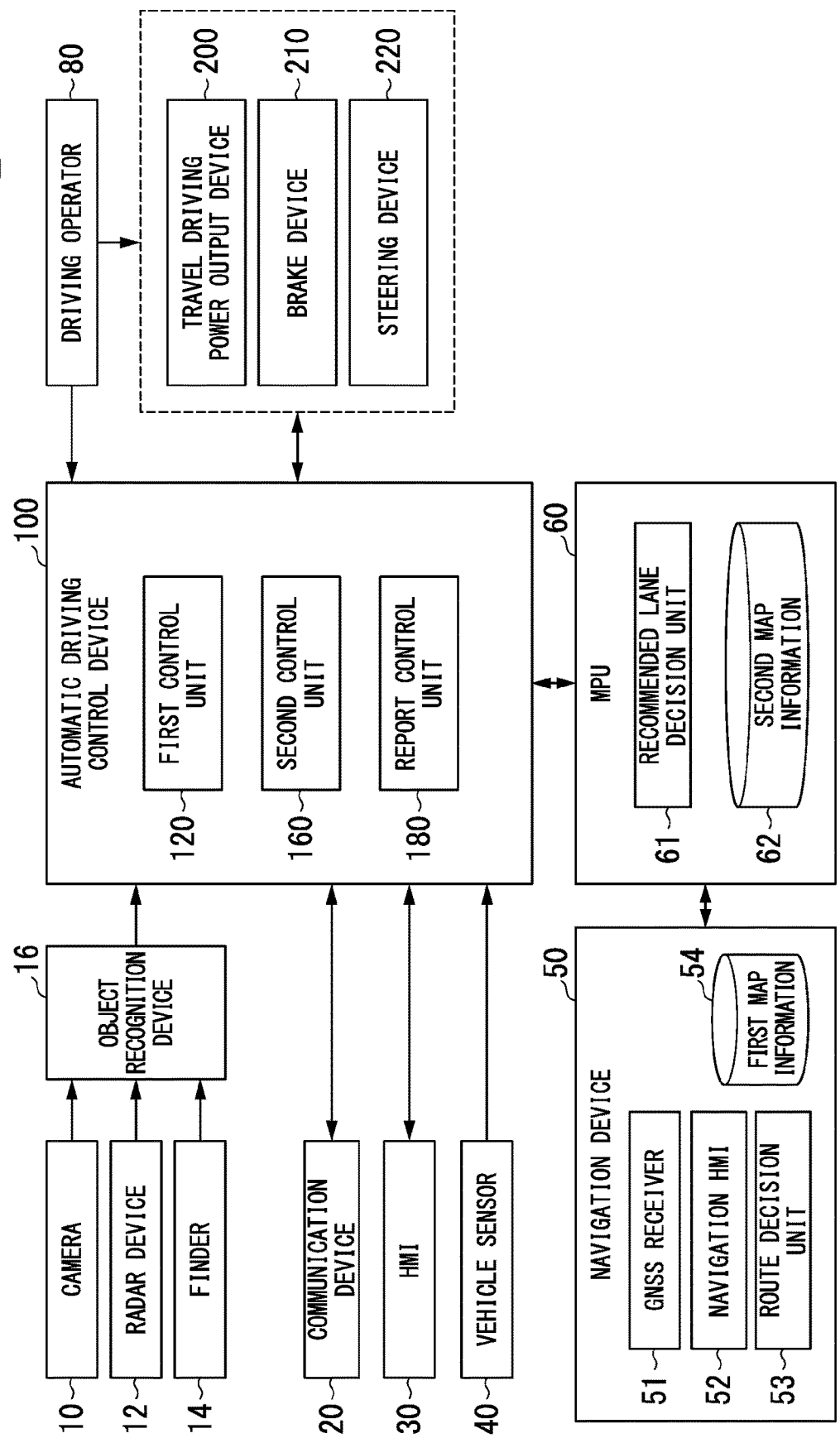
FIG. 1 is a diagram illustrating a configuration of a vehicle control device according to an embodiment.

FIG. 1 is a diagram illustrating a configuration of a vehicle control device 1 in which a vehicle control device 1 is used according to an embodiment. The vehicle in which the vehicle control device 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, and a combination thereof. The electric motor operates using power generated by a power generator connected to the internal combustion engine or power discharged from a secondary cell or a fuel cell.

The vehicle control device 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automatic driving control device 100, a travel driving power output device 200, a brake device 210, and a steering device 220. The devices and units are connected to each other via a multiplex communication line such as a controller area network (CAN) communication line, a serial communication line, or a wireless communication network. The configuration illustrated in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of the vehicle in which the vehicle control device 1 is mounted (hereinafter referred to as an own vehicle M). In the case of forward imaging, the camera 10 is mounted on an upper portion of a front windshield, a rear surface of a rearview mirror, or the like. For example, the camera 10 repeatedly images the periphery of the own vehicle M periodically. The camera 10 may be a stereo camera.

The radar device 12 radiates radio waves such as millimeter waves to the periphery of the own vehicle M and detects radio waves (reflected waves) reflected from an object to detect at least a position (a distance and an azimuth) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 emits light to the periphery of the own vehicle M and measures scattered light. The finder 14 detects a distance to a target based on a time from light emission to light reception. The emitted light is, for example, a pulsed laser beam. The finder 14 is mounted on any portion of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automatic driving control device 100. The object recognition device 16 may output the detection results of the camera 10, the radar device 12, and the finder 14 without change to the automatic driving control device 100. The object recognition device 16 may be omitted from the vehicle control device 1.

The communication device 20 communicates with other vehicles near the own vehicle M using, for example, a cellular network, a Wi-Fi network, Bluetooth (registered trademark), dedicated short range communication (DSRC), or the like or communicates with various server devices via wireless base stations.

The HMI 30 suggests various types of information to occupants of the own vehicle M and receives input operations by the occupants. The HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects an angular velocity around a vertical axis, and an azimuth sensor that detects a direction of the own vehicle M.

The navigation device 50 includes, for example, a global navigation satellite system (GNSS) receiver 51, a navigation HMI 52, and a route decision unit 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely the same as to the above-described HMI 30. The route decision unit 53 decides, for example, a route from a position of the own vehicle M specified by the GNSS receiver 51 (or any input position) to a destination input by an occupant using the navigation HMI 52 (hereinafter referred to as a map route) with reference to the first map information 54. The first map information 54 is, for example, information in which a road form is expressed by links indicating roads and nodes connected by the links. The first map information 54 may include curvatures of roads and point of interest (POI) information.

The map route is output to the MPU 60. The navigation device 50 may perform route guidance using the navigation HMI 52 based on a map route. The navigation device 50 may be realized by, for example, a function of a terminal device such as a smartphone or a tablet terminal possessed by the occupant. The navigation device 50 may transmit a current position and a destination to a navigation server via the communication device 20 to acquire the same route as a map route from the navigation server.

The MPU 60 includes, for example, a recommended lane decision unit 61 and retains second map information 62 in a storage device such as an HDD or a flash memory. The recommended lane decision unit 61 divides a map route provided from the navigation device 50 into a plurality of blocks (for example, divides the map route in a vehicle travel direction every 100 [m]) and decides a recommended lane for each block with reference to the second map information 62. The recommended lane decision unit 61 decides in which lane the own vehicle M travels from the left. When there is a branching spot on a map route, the recommended lane decision unit 61 decides a recommended lane so that the own vehicle M can travel along a reasonable route for traveling to a branching destination.

The second map information 62 is map information with higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently when the communication device 20 communicates with another device.

The driving operator 80 includes, for example, an accelerator pedal, a brake pedal, a shift lever, a steering wheel, a steering variant, a joystick, and other operators. A sensor that detects whether there is an operation or an operation amount is mounted on the driving operator 80. A detection result is output to the automatic driving control device 100 or some or all of the travel driving power output device 200, the brake device 210, and the steering device 220.

The automatic driving control device 100 includes, for example, a first control unit 120 and a second control unit 160. Each of the first control unit 120 and the second control unit 160 is realized, for example, by causing a hardware processor such as a central processing unit (CPU) to execute a program (software). Some or all of these constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device such as an HDD or a flash memory of the automatic driving control device 100 or may be stored in a removable storage medium such as a DVD or a CD-ROM to be installed in the HDD or the flash memory of the automatic driving control device 100 when the storage medium is mounted in the drive device. An action plan generation unit 140 and the second control unit 160 are an example of a "driving control unit." The "driving control unit" may include a potential risk estimation unit 138 to be described below.

Figure 2:
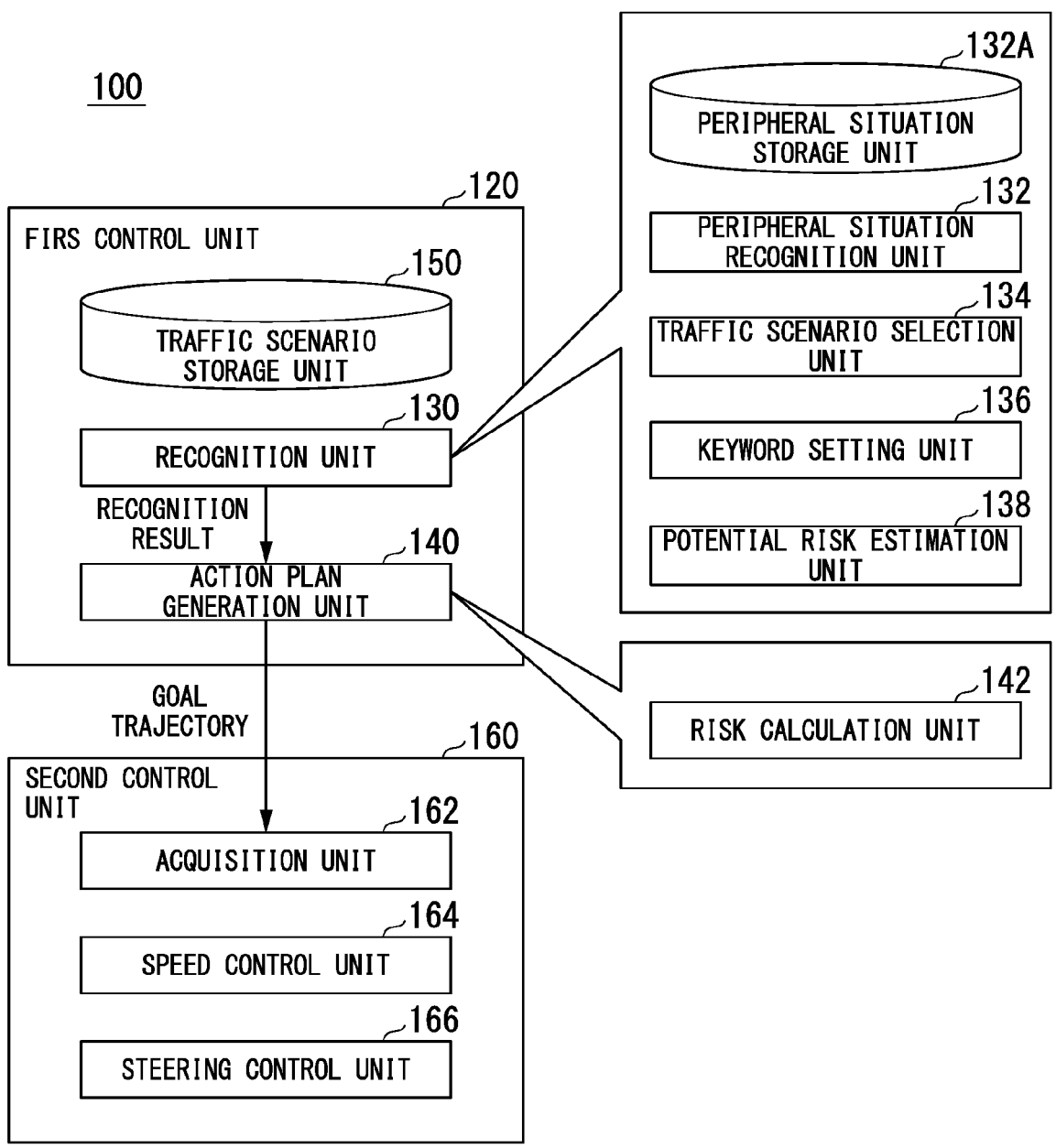
FIG. 2 is a diagram illustrating a functional configuration of a first control unit and a second control unit.

FIG. 2 is a diagram illustrating a functional configuration of the first control unit 120 and the second control unit 160. The first control unit 120 includes, for example, a recognition unit 130 and an action plan generation unit 140. The first control unit 120 concurrently realizes, for example, a function using artificial intelligence (AI) and a function using a pre-given model. For example, an "intersection recognition" function may be realized by concurrently performing recognition of an intersection by deep learning or the like and recognition based on a pre-given condition (there is a sign, a road sign, and the like for which classification matching is possible) and scoring both for comprehensive evaluation. In this way, reliability of automatic driving is guaranteed.

The recognition unit 130 includes, for example, a peripheral situation recognition unit 132, a traffic scenario selection unit 134, a keyword setting unit 136, a potential risk estimation unit 138, and a peripheral situation storage unit 132A. The peripheral situation recognition unit 132 recognizes states such as a position, a speed, acceleration, and the like of objects near the own vehicle M based on information input from the camera 10, the radar device 12, and the finder 14 via the object recognition device 16. The position of an object is recognized as, for example, a position on absolute coordinates in which a representative point (the center of gravity, a center of a driving shaft, or the like) of the own vehicle M is set as the origin and is used for control. The position of an object may be expressed as a representative point of the center of gravity, a corner, or the like of the object or may be expressed in an expressed region. A "state" of an object may include acceleration or jerk of the object or an "action state" (for example, whether to change a lane or attempt to change a lane).

For example, the peripheral situation recognition unit 132 recognizes a lane (travel lane) in which the own vehicle M is traveling. For example, the peripheral situation recognition unit 132 recognizes a travel lane by comparing patterns of road mark lines (for example, arrangement of continuous lines and broken lines) obtained from the second map information 62 with patterns of road mark lines near the own vehicle M recognized from images captured by the camera 10. The peripheral situation recognition unit 132 may recognize a travel lane by mainly recognizing runway boundaries (road boundaries) including road mark lines or shoulders, curbstones, median strips, and guardrails without being limited to road mark lines. In this recognition, the position of the own vehicle M acquired from navigation device 50 or a process result by INS may be added. The peripheral situation recognition unit 132 recognizes temporary stop lines, obstacles, red signals, toll gates, other road events.

The peripheral situation recognition unit 132 recognizes a position or an attitude of the own vehicle M with respect to the travel lane when the peripheral situation recognition unit 132 recognizes the travel lane. For example, the peripheral situation recognition unit 132 may recognize a deviation from the middle of a lane of a standard point of the own vehicle M and an angle formed with a line extending along the middle of a lane in the travel direction of the own vehicle M as a relative position and attitude of the own vehicle M to the travel lane. Instead of this, the peripheral situation recognition unit 132 may recognize a position or the like of the reference point of the own vehicle M with respect to a side end portion (a road mark line or a road boundary) of any travel lane as the relative position of the own vehicle M to the travel lane.

The peripheral situation recognition unit 132 distinguishes and recognizes each object typified by a travel lane, a runway boundary, a side strip, a footway, or the like (hereinafter referred to as a road environment) and a traffic participant near the own vehicle M (another vehicle, a bicycle, a pedestrian, or the like). For example, the peripheral situation recognition unit 132 may identify a recognized target as an object or a road environment based on a relative speed of a recognized target in the same direction as a progress direction of the own vehicle M. For example, the peripheral situation recognition unit 132 may identify the recognized target as an object when the relative speed of the recognized target is different from that of the own vehicle M or changes, and may identify the recognized target as a road environment when the relative speed of the recognized object is nearly the same as the own vehicle M. The peripheral situation recognition unit 132 recognizes temporary stop lines, cross-walks, road signs, obstacles, red signals, toll gates, other road events as objects rather than road environments.

Figure 3:
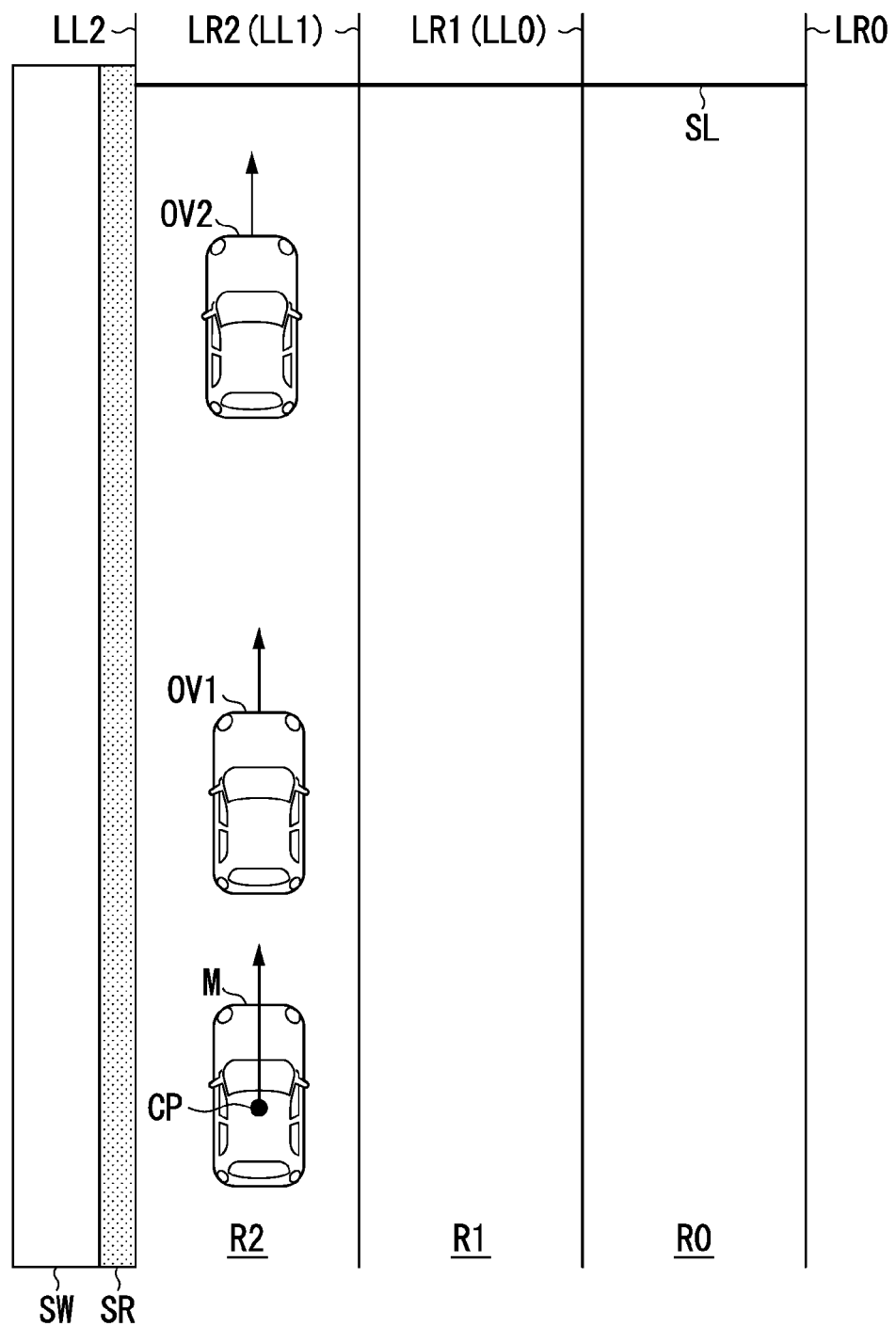
FIG. 3 is a diagram for describing processes of a recognition unit and an action plan generation unit.

FIG. 3 is a diagram for describing a process of the peripheral situation recognition unit 132. In the example of FIG. 3, the own vehicle M is traveling along a lane R2, a footway SW and a side strip SR is located on the left side in the travel direction, and a median strip MS and other lanes R0 and R1 are located on the right side in the travel direction. The peripheral situation recognition unit 132 recognizes, for example, the side strip SR, mark lines LL2 and LR2 of the lane R2 along which the own vehicle M is traveling, and mark lines LR0, LL0 (which may be the same mark line as LR1), LR1 (which may be the same mark line as LL0) and LR2 (which may be the same mark line as LL1) of the lanes R0 and R1 adjacent to the lane R1 and outputs recognition results to the traffic scenario selection unit 134 in the example of FIG. 3. The peripheral situation recognition unit 132 recognizes other vehicles OV1 and OV2 which are traffic participants and outputs the recognition results to the peripheral situation storage unit 132A and the traffic scenario selection unit 134. The traffic scenario selection unit 134, the keyword setting unit 136, and the potential risk estimation unit 138 will be described later.

In principle, the action plan generation unit 140 travels along a recommended lane decided by the recommended lane decision unit 61 and further generates a goal trajectory along which the own vehicle M travels in future automatically (independently from an operation of a driver or the like) to handles a surrounding situation of the own vehicle M. The goal trajectory includes, for example, a speed component. For example, the goal trajectory is expressed by sequentially arranging spots (trajectory points) at which the own vehicle M arrives. The trajectory point is a spot at which the own vehicle M arrives for each predetermined travel distance (for example, about several [m]) by a distance along a road. Apart from this, goal acceleration and a goal speed at each predetermined sampling time (for example, about 0 decimal points [sec]) are generated as a part of the goal trajectory. The trajectory point may be a position at which the own vehicle M arrives at the sampling time for each predetermined sampling time. In this case, information regarding the goal speed or the goal acceleration is expressed at intervals of the trajectory point.

The action plan generation unit 140 may set an automatic driving event when the goal trajectory is generated. As the automatic driving event, there are a constant speed traveling event, a low speed track traveling event, a lane changing event, a branching event, a joining event, a takeover event, and the like. The action plan generation unit 140 generates the goal trajectory in accordance with an activated event.

The second control unit 160 controls the travel driving power output device 200, the brake device 210, and the steering device 220 so that the own vehicle M passes along the goal trajectory generated by the action plan generation unit 140 on a scheduled time.

The action plan generation unit 140 includes, for example, a risk analysis unit 142. The risk analysis unit 142 will be described later.

Referring back to FIG. 2, the second control unit 160 includes, for example, an acquisition unit 162, a speed control unit 164, and a steering control unit 166. The acquisition unit 162 acquires information regarding the goal trajectory (trajectory points) generated by the action plan generation unit 140 and stores the information in a memory (not illustrated). The speed control unit 164 controls the travel driving power output device 200 or the brake device 210 based on a speed element incidental to the goal trajectory stored in the memory. The steering control unit 166 controls the steering device 220 in accordance with a curve state of the goal trajectory stored in the memory. Processes of the speed control unit 164 and the steering control unit 166 are realized, for example, by combining feed-forward control and feedback control. For example, the steering control unit 166 performs the feed-forward control in accordance with a curvature of a road in front of the own vehicle M and the feedback control based on separation from the goal trajectory in combination.

The travel driving power output device 200 outputs a travel driving force (torque) for traveling the vehicle to a driving wheel. The travel driving power output device 200 includes, for example, a combination of an internal combustion engine, an electric motor and a transmission, and an ECU controlling these units. The ECU controls the foregoing configuration in accordance with information input from the second control unit 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second control unit 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second control unit 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second control unit 160 or information input from the driving operator 80.

[Configurations of First Control Unit and Second Control Unit]

Referring back to FIG. 2, the traffic scenario selection unit 134 recognizes a situation in which the own vehicle M is traveling based on a recognition result of the peripheral situation recognition unit 132, estimates a situation in which the own vehicle M soon approaches, and selects a traffic scenario. Traffic scenarios are classified into optimum classifications among classifications in which the situation in which the own vehicle M is traveling or the situation in which the own vehicle M soon approaches is set in advance. For example, when the traffic scenario selection unit 134 recognizes an intersection in front of the own vehicle M, the traffic scenario selection unit 134 selects a traffic scenario which is the most suitable for a situation in which the own vehicle M is traveling from traffic scenarios related to the intersection stored in a traffic scenario storage unit 150.

For example, the traffic scenarios may include information regarding driving operations such as "go straight" and "turn left," may include geographic information such as "intersection of three one-way lanes in downtown" and "periphery of elementary school in residential street," may include information regarding a time zone or weather such as "early morning on Sunday" and "evening in rainy day," or may include information regarding a runway state such as "congestion." The peripheral situation recognition unit 132 derives the information regarding a driving operation from a detection result of a sensor that is installed in the driving operator 80 and detects an operation amount or the like. The information regarding a time zone or weather may be derived from a result recognized by the peripheral situation recognition unit 132 or may be information acquired by causing the communication device 20 to communicate with another device. Information regarding a related potential risk is associated with the traffic scenario. For example, information regarding a potential risk such as "dashing of child" is associated with the traffic scenario of "periphery of elementary school in residential street." The potential risk may include information regarding an occurrence possibility of the potential risk. The traffic scenario selection unit 134 selects a traffic scenario based on a recognition result of a road event or a traffic participant (another vehicle, a bicycle, a pedestrian, or the like) near the own vehicle M recognized by the peripheral situation recognition unit 132 and outputs the traffic scenario to the keyword setting unit 136. The traffic scenario selection unit 134 may set a keyword in advance for a characteristic traffic participant or road event in the recognition result and output the keyword to the keyword setting unit 136 to be described below.

The keyword setting unit 136 searches for information of a potential risk associated with the traffic scenario output by the traffic scenario selection unit 134 from the traffic scenario storage unit 150 based on the traffic scenario output by the traffic scenario selection unit 134. When a keyword is output by the traffic scenario selection unit 134, the keyword setting unit 136 may use the keyword to search for the information regarding the potential risk associated with the traffic scenario. The keyword setting unit 136 selects and sets a keyword indicating a travel state of the own vehicle M from words stored in advance in the traffic scenario storage unit 150 from the information regarding the potential risk associated with the traffic scenario from the searching result and outputs the set keyword and the traffic scenario output by the traffic scenario selection unit 134 to the potential risk estimation unit 138.

The potential risk estimation unit 138 estimates a potential risk of the own vehicle M from the information regarding the potential risk associated with the traffic scenario stored in the traffic scenario storage unit 150 based on the traffic scenario and the keyword output by the keyword setting unit 136. The potential risk estimation unit 138 outputs an estimation result to the risk analysis unit 142.

The risk analysis unit 142 performs risk analysis based on the estimation result output by the potential risk estimation unit 138, determines whether a goal trajectory is generated based on a peripheral situation of the own vehicle M recognized by the peripheral situation recognition unit 132 or a goal trajectory in which a risk analysis result is reflected is generated, and generates a goal trajectory based on a determination result.

[Recognition Process of Recognition Result]

Hereinafter, processing of a recognition result by the peripheral situation recognition unit 132 will be described with reference to FIGS. 3 and 4. Referring back to FIG. 3, the peripheral situation recognition unit 132 recognizes that the own vehicle M is traveling in the lane R2 and the side strip SR is located 0.75 [m] to the left in the travel direction of the own vehicle M. The peripheral situation recognition unit 132 recognizes that the other lanes R0 and R1 and a median line LR0 are located on the right side in the travel direction of the own vehicle M. The peripheral situation recognition unit 132 recognizes that the other vehicles OV1 and OV2 are located in front of the own vehicle M in the travel direction, a distance between the own vehicle M and the other vehicle OV1 is within 5 [m], and a distance between the own vehicle M and the other vehicle OV2 is within 15 [m]. The peripheral situation recognition unit 132 recognizes that a stop line SL is located in front of the own vehicle M in the travel direction and a distance between the own vehicle M and the stop line SL is within 20 [m].

FIG. 4 is a diagram illustrating an example of a table stored in the peripheral situation storage unit 132A. The peripheral situation recognition unit 132 summarizes and manages recognition results of objects or a road environment near the own vehicle M in one data table T illustrated in FIG. 4 in the peripheral situation storage unit 132A. For example, the peripheral situation storage unit 132A retains recognition results of recognized objects as elements of columns of the data table T and retains recognition results of recognized road environments as elements of rows (records)

of the data table T. In the following description, positions of cells (minimum elements included in the data table T) will be described by giving letters as column names included in the data table T, giving numbers as row names included therein, and combining the letters indicating the column names and the numbers indicating the row names. In each cell of the data table T illustrated in FIG. 4, data of "1 (indicating that the own vehicle is there)" or "(number indicating the number of recognition targets)*(distances from the recognition targets)" is stored. In the following description, "*(asterisk)" is used as a sign indicating a separation position of the number indicating the number of recognition targets and the distances from the recognition targets.

For example, in cell B4 of the data table T inn FIG. 4, information indicating that it is recognized that a distance between the own vehicle M and the side strip SR is "0.75 [m]" is stored in the third row (the road strip) of the B column (the own vehicle). In cell A1 of the data table T in FIG. 4, a time stamp which is a generation time of a recognition result related to the own vehicle M is stored and "1" of cells B7 and B8 of the data table T represents that a flag indicating that the own vehicle M is traveling in the travel lane R2 is stored. In cell C7 of the data table T in FIG. 4, "1*5 [m]" indicating that one vehicle is at a position within 5 [m] from the own vehicle M and is traveling is stored as a recognition result of the other vehicle OV1. In cell C8, "1*15 [m]" indicating that one other vehicle is at a position within 15 [m] from the own vehicle M and is traveling is stored as a recognition result of the other vehicle OV2. In cells G4 to G8, "1*20 [m]" indicating that one stop line is at a position within 20 [m] from the own vehicle M as a recognition result of the stop line SL is stored. In other cells, it can be understood that traffic participants other than the foregoing participants are not recognized since no recognition result is stored by the peripheral situation recognition unit 132.

The keyword setting unit 136 performs keyword setting based on a recognition result stored in the data table T illustrated in FIG. 4. The potential risk estimation unit 138 reflects the estimated potential risk in the data table T. The potential risk estimation unit 138 grants, for example, an identification flag or the like to reflect the estimated potential risk in the data table T so that the estimated potential risk and the recognition result recognized by the peripheral situation recognition unit 132 can be identified.

[Selection of Traffic Scenario]

Figure 5:
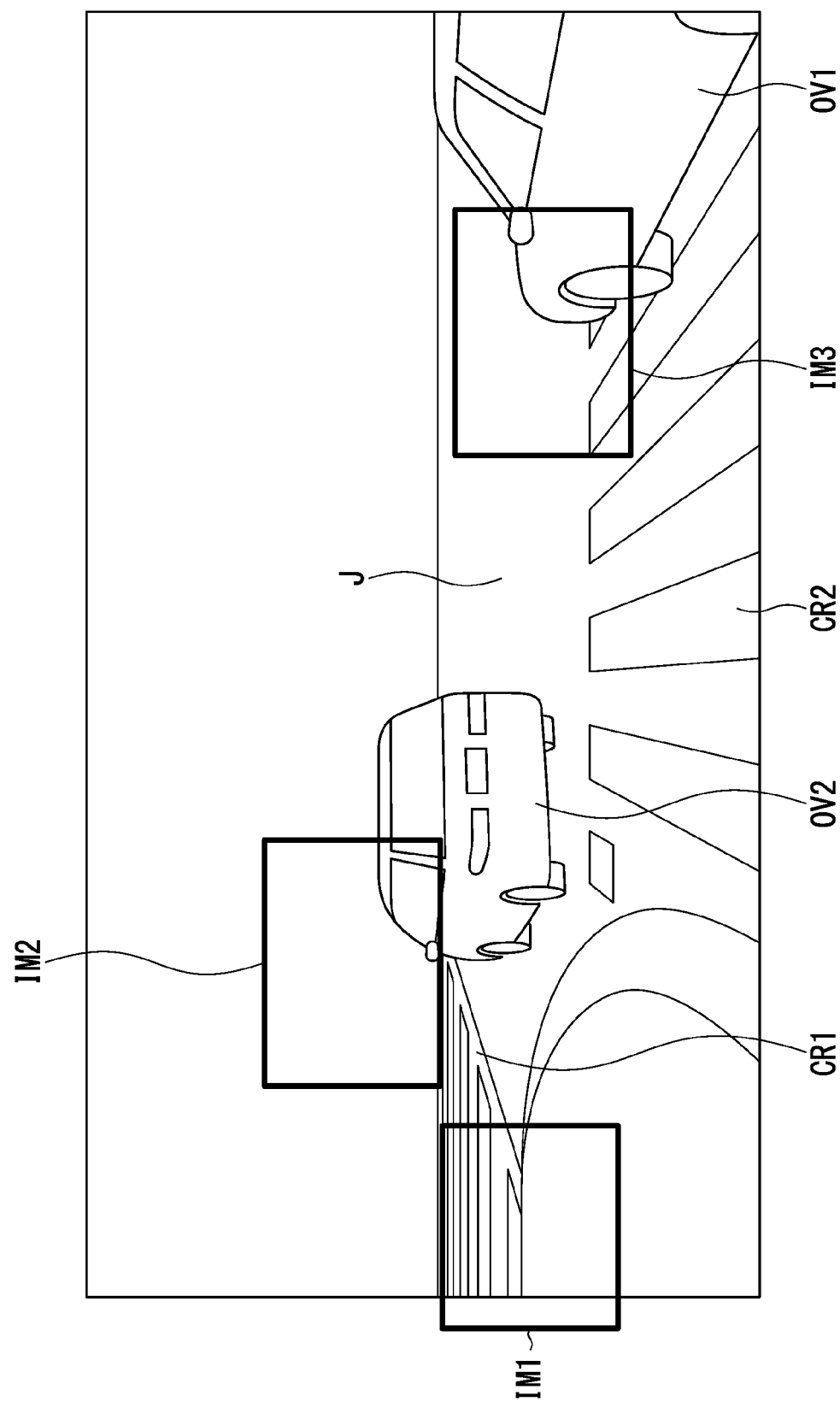
FIG. 5 is a diagram illustrating an example of a travel environment of an own vehicle recognized by the recognition unit.

FIG. 5 is a diagram illustrating an example of a travel environment of the own vehicle M recognized by the peripheral situation recognition unit 132. As illustrated in FIG. 5, the own vehicle M is approaching an intersection and is traveling in an exclusive left turn lane. The own vehicle M will soon enter the intersection, and an occupant of the own vehicle M may indicate a left turn to nearby traffic participants using a direction indicator in the driving operator 80. The peripheral situation recognition unit 132 recognizes an intersection J, cross-walks CR1 and CR2, and the other vehicles OV1 and OV2 in front. Differently from the recognition result of FIG. 3, the peripheral situation recognition unit 132 recognizes that the other vehicle OV1 is traveling in the lane R1 which is on the right side in the travel direction of the own vehicle.

The traffic scenario selection unit 134 searches for a traffic scenario close to a situation in which the own vehicle M recognized by the peripheral situation recognition unit 132 is traveling from the traffic scenarios stored in the traffic scenario storage unit 150. For example, when the traffic scenario storage unit 150 stores three kinds of traffic scenarios, "go straight at intersection," "turn right at intersection," and "turn left at intersection," the traffic scenario selection unit 134 selects a traffic scenario corresponding to the classification of "turn left at intersection" as a traffic scenario which is the most similar to the state in which the own vehicle M is traveling from the recognition result such as traveling of the own vehicle M in the exclusive left turn lane. The traffic scenario selection unit 134 outputs the selected traffic scenario of "turn left at intersection" to the keyword setting unit 136.

For example, the keyword setting unit 136 identifies and sets a keyword for each of the traffic participants or the road events recognized by the peripheral situation recognition unit 132. For example, the keyword setting unit 136 sets a keyword for identifying a region (traffic scenario region) of an image or the like in which the recognized traffic participant or road event is recognized, for example, the other vehicle OV1 recognized as "a vehicle traveling in parallel within a distance of 5 [m] from the own vehicle" and the other vehicle OV2 recognized as "a vehicle traveling in front within a distance of 15 [m] from the own vehicle," and a target of the region. When there are a plurality of keywords set in the traffic scenario region by the keyword setting unit 136, the keywords may be managed as a collection of words or a simple clause or sentence may be generated from the keywords.

For example, when the peripheral situation recognition unit 132 recognizes that the own vehicle M turns left at an intersection of three one-way lanes in a downtown area in the early morning on a Sunday, the keyword setting unit 136 sets keywords such as "Sunday," "early morning," "downtown," "three one-way lanes," "intersection," and "turn left." Alternatively, the keyword setting unit 136 may set a sentence formed by a recognition result such as "turn left at the intersection of three one-way lanes in a downtown area in the early morning on a Sunday" recognized by the peripheral situation recognition unit 132 as a keyword without separation or may separate the sentence into pieces such as "early morning on a Sunday," "three one-way lanes in a downtown area," and "turn left at intersection" and set these as keywords. The keyword setting unit 136 outputs the set keywords to the potential risk estimation unit 138.

In FIG. 5, the keyword setting unit 136 sets keywords including "cross-walk" and "intersection with bad visibility" in a traffic scenario region IM1 including the cross-walk CR1. The keyword setting unit 136 sets keywords including "cross-walk" and "blind angle formed by front vehicle" in a traffic scenario region IM2 including the other vehicle OV2 and the cross-walk CR1. The keyword setting unit 136 sets keywords including "cross-walk" and "blind angle formed by vehicle traveling in parallel on right side" in a traffic scenario region IM3 including the other vehicle OV1 and the cross-walk CR2.

[Estimation of Potential Risk]

The potential risk estimation unit 138 estimates a potential risk using a traffic scenario region related to the traffic scenario "turn left at intersection" output by the traffic scenario selection unit 134 and set by the keyword setting unit 136 and a keyword associated with the traffic scenario region. For example, the potential risk estimation unit 138 searches for a risk region from the traffic scenario storage unit 150 using the keyword set by the keyword setting unit 136 in the traffic scenario "turn left at intersection." For example, the potential risk estimation unit 138 sets a traffic scenario region including the cross-walk CR1 as a searching result found by the traffic scenario storage unit 150 as a risk region. The risk region is a traffic scenario region in which a target itself with a high potential risk or a target related to the target with the high potential risk is recognized.

For example, the potential risk estimation unit 138 acquires information regarding a potential risk of "bicycle which is not recognized at current time point appears from rear and crosses intersection" corresponding to the traffic scenario region IM1 in FIG. 5 or "pedestrian who is not recognized at current time point appears in front and crosses intersection" corresponding to the traffic scenario region IM2. The information regarding the potential risk such as "bicycle which is not recognized at current time point appears from rear and crosses intersection" or "pedestrian who is not recognized at current time point appears in front and crosses intersection" is acquired, for example, by searching for a risk region stored in the traffic scenario storage unit 150 with a keyword set by the keyword setting unit 136.

The potential risk estimation unit 138 estimates, for example, a traffic scenario which has to be avoided (potential hazard scenario) such as "sudden stop" of another preceding vehicle OV2 or "sudden approach" between the own vehicle M and a bicycle which is not recognized at a current time point from the potential risk such as "bicycle which is not recognized at current time point appears from rear and crosses intersection." The potential risk estimation unit 138 outputs an estimation result including the acquired potential risk or the potential hazard scenario to the risk analysis unit 142. The potential risk estimation unit 138 may perform setting priority of each risk region when there are a plurality of risk regions. For example, the potential risk estimation unit 138 sets a high priority for a target which is closest to the own vehicle M and sets a higher priority for a target located in the movement direction of the own vehicle M than for a target which is not located in a movement direction of the own vehicle M. The potential risk estimation unit 138 may select only a risk region or a potential hazard scenario in which high priority is set and output the risk region or the potential hazard scenario to the risk analysis unit 142.

[Risk Analysis]

The risk analysis unit 142 performs risk analysis based on an estimation result output by the potential risk estimation unit 138. The risk analysis is, for example, a process of plotting information regarding a contour line indicating "bicycle" or "pedestrian" for which an estimation result output by the potential risk estimation unit 138 embodies a potential risk such as "bicycle which is not recognized at current time point appears from rear and crosses intersection" or "pedestrian who is not recognized at current time point appears in front and crosses intersection" in a recognition space used at the time of processing a position of an object recognized by the peripheral situation recognition unit 132 in the real space to compose it with a peripheral situation of the own vehicle M recognized by the peripheral situation recognition unit 132 and reproduce an environment of the own vehicle M in which the potential risk is considered. Image information used to embody the potential risk may be generated using some or all of the images recognized by the peripheral situation recognition unit 132 or may be generated using image information stored in the traffic scenario storage unit 150.

Figure 6:
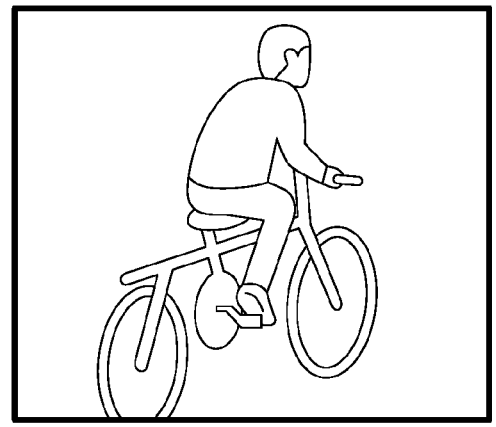
FIG. 6 is a diagram illustrating an example of an image used for a risk analysis unit to perform risk analysis.
Figure 7:
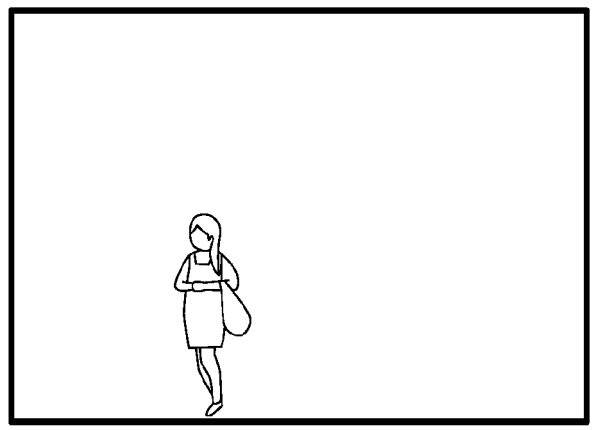
FIG. 7 is a diagram illustrating another example of the image used for the risk analysis unit to perform the risk analysis.
Figure 8:
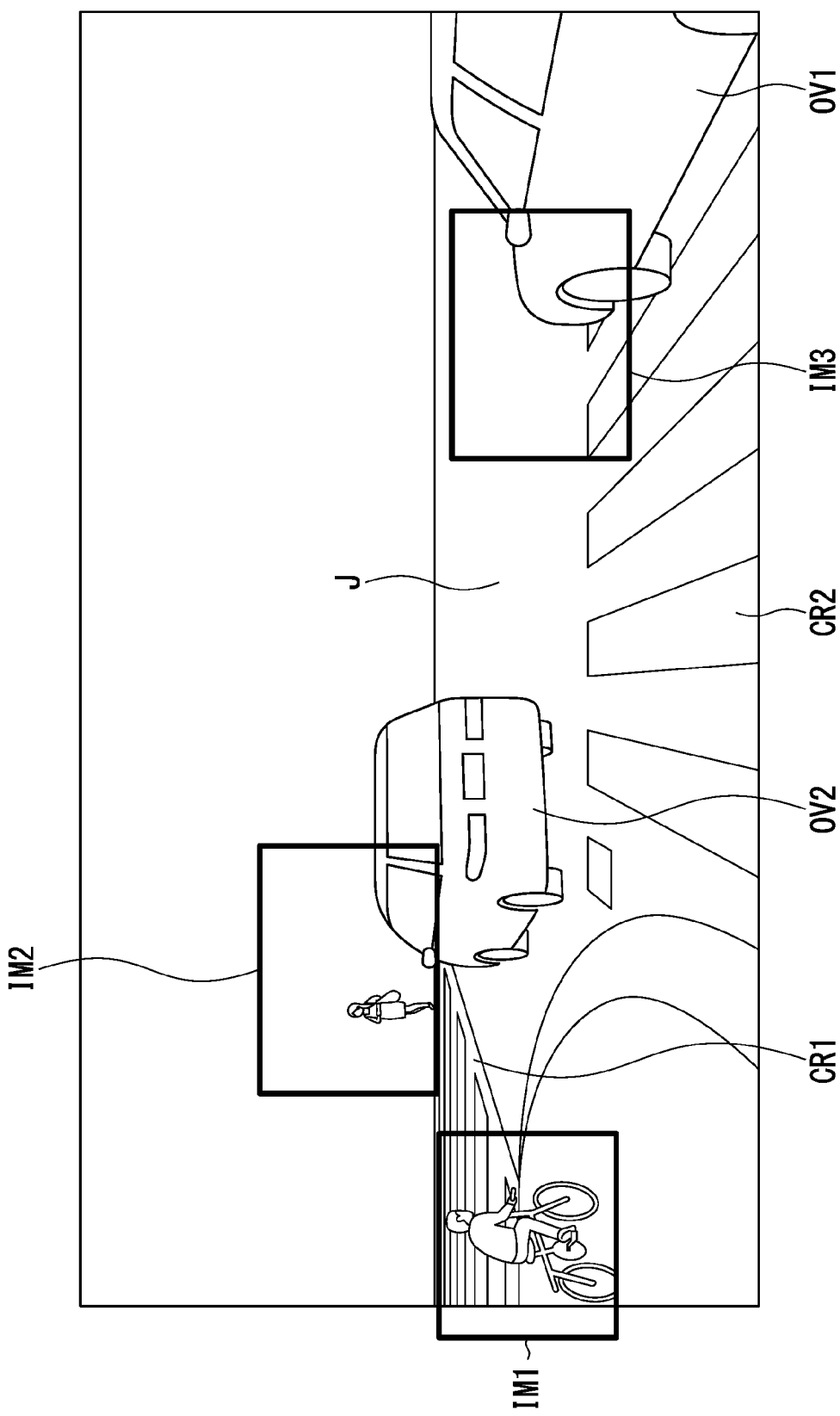
FIG. 8 is a diagram illustrating a travel environment of an own vehicle M reproduced by the risk analysis unit.

FIG. 6 is a diagram illustrating an example of image information of "bicycle" of "bicycle which is not recognized at current time point appears from rear and crosses intersection" used for the risk analysis unit 142 to perform the risk analysis. FIG. 7 is a diagram illustrating another example of the image information of "pedestrian" of "pedestrian who is not recognized at current time point appears in front and crosses intersection" used for the risk analysis unit 142 to perform the risk analysis. The risk analysis unit 142 composes the image information of "bicycle" illustrated in FIG. 6 with the traffic scenario region IM1 of the current own vehicle M illustrated in FIG. 5, composes the image information of "pedestrian" illustrated in FIG. 7 with the traffic scenario region IM2, and reproduces a travel environment of the own vehicle M. FIG. 8 is a diagram illustrating a travel environment of the own vehicle M reproduced by the risk analysis unit 142.

The risk analysis unit 142 determines whether goal trajectory generation is performed based on the reproduced peripheral situation of the own vehicle M illustrated in FIG. 8 or goal trajectory generation is performed based on a peripheral situation of the own vehicle M recognized by the peripheral situation recognition unit 132. The risk analysis unit 142 determines that the goal trajectory generation is performed based on the reproduced peripheral situation of the own vehicle, for example, when the peripheral situation recognition unit 132 does not recognize whether there are traffic participants crossing the cross-walks CR1 and CR2 of the intersection J and stopping due to obstacles such as a large vehicle, a tree, a signboard, or a building.

For example, the risk analysis unit 142 compares a risk value which can be derived from the peripheral situation of the own vehicle M recognized by the peripheral situation recognition unit 132 with a potential risk value which can be derived from the reproduced peripheral situation of the own vehicle M, decides to generate a goal trajectory based on the peripheral situation of the own vehicle M recognized by the peripheral situation recognition unit 132 when the risk value is equal to or greater than the potential risk value, and decides to generate the goal trajectory based on the reproduced peripheral situation of the own vehicle M when the risk value is less than the potential risk value. The risk value and the potential risk value may be ratios indicating how much an unexpected situation is considered or may be numerical values with which the degree of an unexpected situation can be accessed (for example, a physical quantity indicating strength of an impact when an unexpected situation is encountered, an expected time necessary for the own vehicle M to resume traveling when an unexpected situation is encountered, or an energy amount necessary to avoid an unexpected situation).

The risk analysis unit 142 may derive the risk value and the potential risk value based on a probability distribution of probabilities of presence of the own vehicle M and objects (for example, other traffic participants) other than the own vehicle M on an estimated route of the own vehicle M. When it is determined that the risk value is equal to or greater than the potential risk value, the risk analysis unit 142 generates a goal trajectory from a peripheral situation of the own vehicle M recognized by the peripheral situation recognition unit 132 (an actual traffic scenario, for example, a state of FIG. 5). When it is determined that the risk value is less than the potential risk value, the risk analysis unit 142 generates a goal trajectory from a reproduced peripheral situation of the own vehicle M (a reproduced potential hazard scenario, for example, a state of FIG. 8). When it is determined that the risk value is equal to or greater than the potential risk value, the risk analysis unit 142 may store a recognition result of the peripheral situation recognition unit 132 at that time in the traffic scenario storage unit 150 in order to improve later estimation precision by the potential risk estimation unit 138.

The risk analysis unit 142 may digitize good visibility of the intersection J and set the digitized numerical value as a determination material. When the derived numerical value indicating the good visibility is less than a preset threshold, the risk analysis unit 142 determines to perform the goal trajectory generation based on the reproduced peripheral situation of the own vehicle M. When the derived numerical value indicating the good visibility is equal to or greater than a preset threshold, the risk analysis unit 142 determines to perform the goal trajectory generation based on the peripheral situation of the own vehicle M recognized by the peripheral situation recognition unit 132.

The risk analysis unit 142 outputs the reproduced peripheral situation of the own vehicle M illustrated in FIG. 8 to a display device such as the HMI 30. When the risk analysis unit 142 generates the goal trajectory based on the reproduced peripheral situation of the own vehicle M and performs driving control to decelerate or temporarily stop in consideration of the potential risk, there is a possibility of the occupant of the own vehicle M feeling a sensation of discomfort from the trajectory or speed of the own vehicle M. The occupant of the own vehicle M can understand the deceleration or the temporary stop is in consideration of the potential risk from the display device, and thus it is possible to resolve the sensation of discomfort from the trajectory or speed of the own vehicle M.

[Traffic Scenario Storage Unit]

Hereinafter, traffic scenarios stored in the traffic scenario storage unit 150 will be described. The traffic scenario storage unit 150 stores traffic scenarios, keywords related to the traffic scenarios, information regarding potential hazards related to the traffic scenarios, traffic scenario regions, risk regions, potential risks, potential hazard scenarios, and the like systematically. In the traffic scenarios stored in the traffic scenario storage unit 150, time zones or traffic participants are preferably set as indexes.

Figure 9:
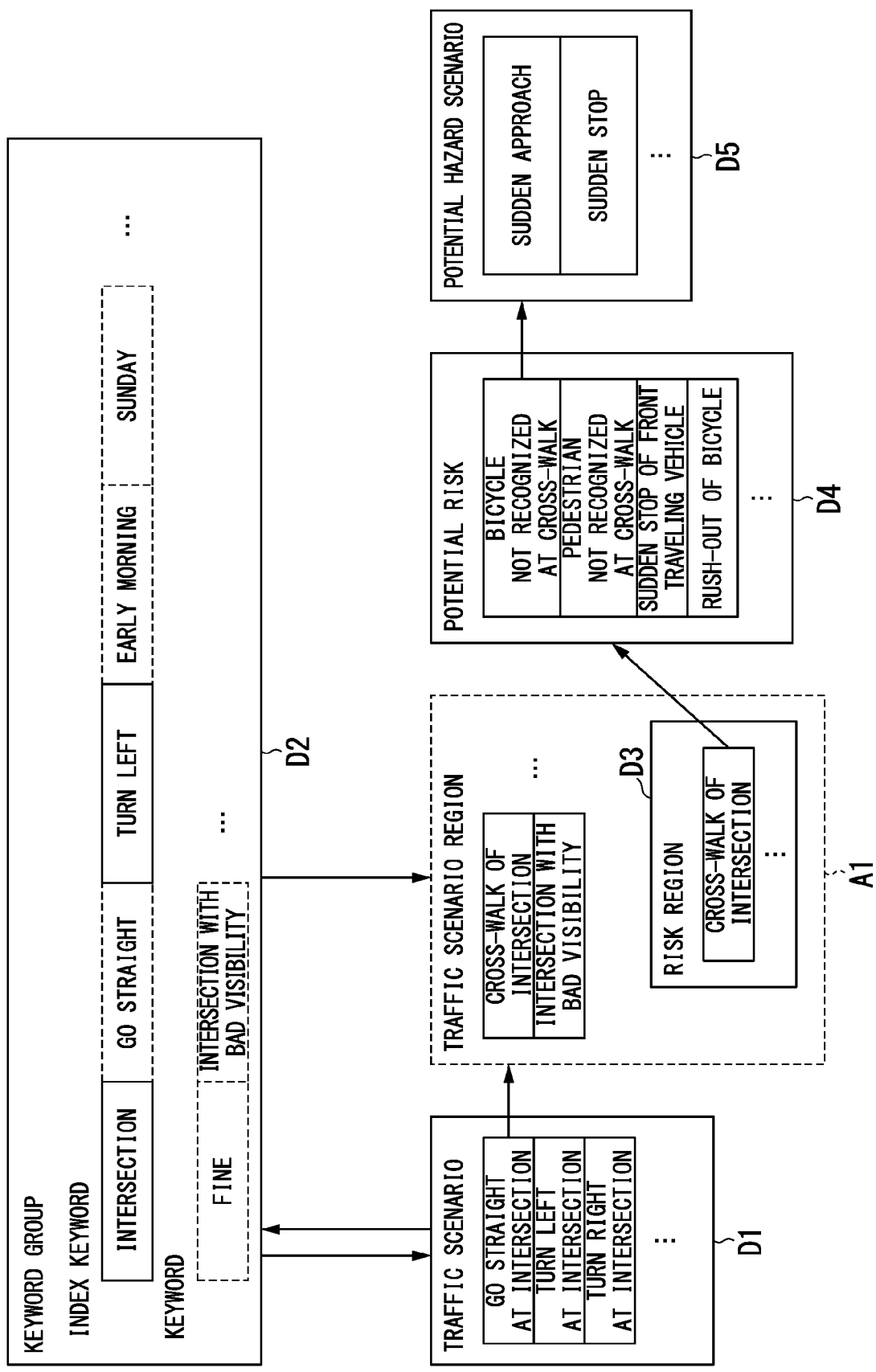
FIG. 9 is a diagram for describing various kinds of information stored by a traffic scenario storage unit.

FIG. 9 is a diagram for describing various kinds of information stored by the traffic scenario storage unit 150. An example in which various kinds of information stored in the traffic scenario storage unit 150 are called in processes performed by the traffic scenario selection unit 134, the keyword setting unit 136, the potential risk estimation unit 138, and the risk analysis unit 142 will be described with reference to FIG. 9. In FIG. 9, D1 to D5 are various information groups stored in the traffic scenario storage unit 150. In FIG. 9, A1 is a keyword group set by the keyword setting unit 136 and associated with traffic scenario regions.

First, the traffic scenario selection unit 134 selects an optimum kind of traffic scenario among types of the traffic scenario group D1 based on a recognition result of the peripheral situation recognition unit 132 and outputs the selected optimum kind of traffic scenario to the keyword setting unit 136. When a keyword is set from the recognition result of the peripheral situation recognition unit 132, the traffic scenario selection unit 134 outputs the selected traffic scenario to the keyword setting unit 136 in conjunction with the keyword. The keyword setting unit 136 searches for a keyword associated with the traffic scenario output by the traffic scenario selection unit 134 from the keyword group D2, sets the traffic scenario region, and outputs a setting result to the potential risk estimation unit 138. At this time, the keyword setting unit 136 selects one or more index keywords corresponding to the indexes of the time zone or the traffic participants among the keywords stored in the traffic scenario storage unit 150.

The potential risk estimation unit 138 performs extraction from the risk region group D3 based on the traffic scenario selected by the traffic scenario selection unit 134 and the traffic scenario region A1 output by the keyword setting unit 136 and estimates the risk region. Further, the potential risk estimation unit 138 searches for the potential risk related to the risk region from the potential risk group D4 of the traffic scenario storage unit 150 and extracts a potential hazard scenario related to the searching result from the potential hazard scenario group D5.

The various information groups D1 to D5 stored in the traffic scenario storage unit 150 may be initially set in accordance with a travel environment of the own vehicle M and may be added or deleted from the initial setting state through the communication device 20 or the like.

In this way, the first control unit 120 can estimate a potential hazard risk related to an obstacle which is near the own vehicle M more appropriately by comparing the recognition result of the peripheral situation recognition unit 132 with a reproduction result produced from the information related to the traffic scenario stored in the traffic scenario storage unit 150 by the risk analysis unit 142 and generate a goal trajectory based on a comparison result, and thus it is possible to perform driving control such that the estimation result is reflected in the vehicle control device 1.

[Process Flow]

Figure 10:
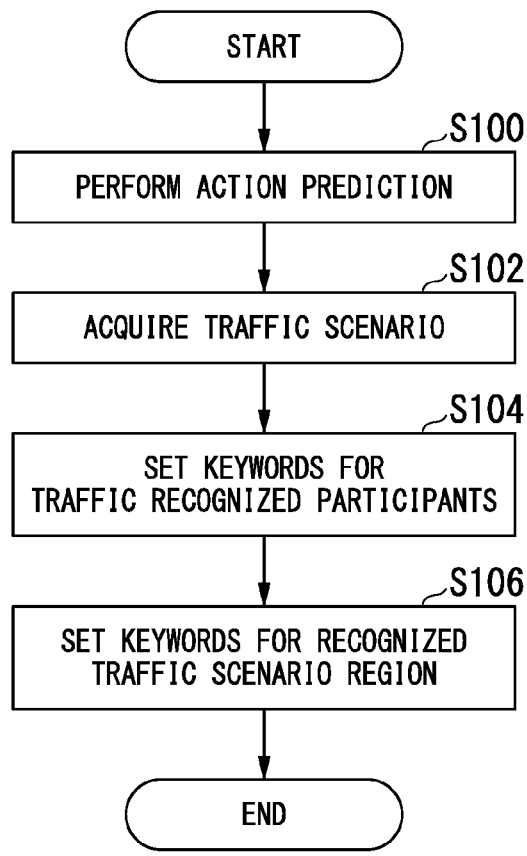
FIG. 10 is a flowchart illustrating an example of a flow of a traffic scenario setting process by a traffic scenario selection unit and a keyword setting process by a keyword setting unit.

FIGS. 10, 11, 12, and 13 are flowcharts illustrating example flows of processes of the first control unit 120 and the second control unit 160. FIG. 10 is a flowchart illustrating an example of a flow of a traffic scenario setting process by the traffic scenario selection unit 134 and a keyword setting process by the keyword setting unit 136. The process of the flowchart illustrated in FIG. 10 may be performed repeatedly, for example, at a predetermined period or at a predetermined timing.

First, the peripheral situation recognition unit 132 performs an action estimation of the own vehicle M and recognition targets near the recognized own vehicle M (step S100). Subsequently, the traffic scenario selection unit 134 acquires a traffic scenario (step S102). Subsequently, the keyword setting unit 136 sets keywords for traffic participants recognized by the peripheral situation recognition unit 132 (step S104) and further sets keywords for a traffic scenario region recognized by the peripheral situation recognition unit 132 (step S106). Then, the process of the flowchart ends.

Figure 11:
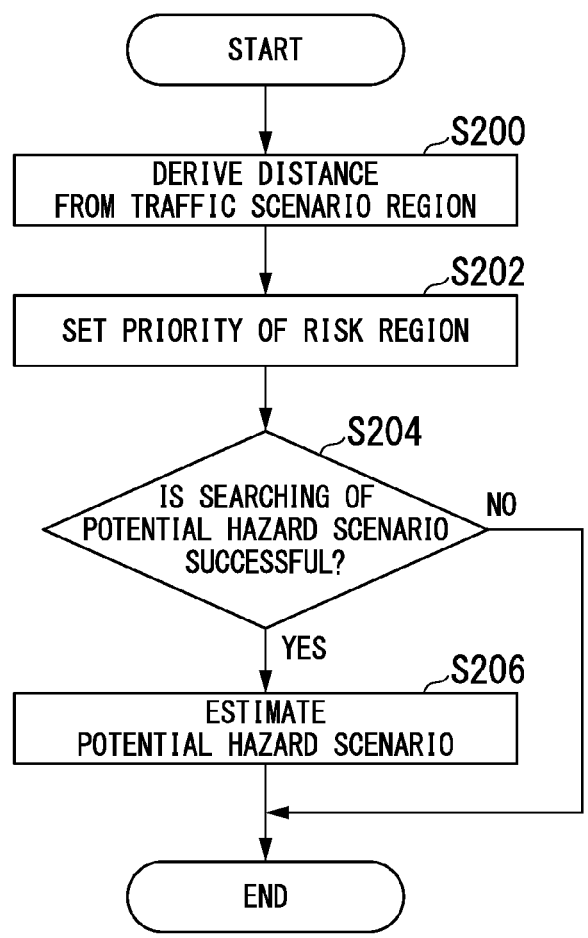
FIG. 11 is a flowchart illustrating an example of a flow of a process of estimating a potential risk reminded from a traffic scenario by a potential risk estimation unit.

FIG. 11 is a flowchart illustrating an example of a flow of a process of estimating an associated potential risk from a traffic scenario by the potential risk estimation unit 138. For example, the process of the flowchart illustrated in FIG. 11 may be performed at a predetermined period or a predetermined timing repeatedly as in the flowchart of FIG. 10 or may be performed when it is detected that the process of the flowchart of FIG. 10 ends.

The potential risk estimation unit 138 derives a distance between the own vehicle M and the traffic scenario region recognized by the peripheral situation recognition unit 132 (step S200). Subsequently, the potential risk estimation unit 138 recognizes a risk region in the traffic scenario region and performs priority setting in the risk region (step S202). The potential risk estimation unit 138 searches for the traffic scenario storage unit 150 using the keywords associated with the risk region and determines whether the searching is successful (step S204). When the searching is successful, a potential hazard scenario is estimated from a searching result and is output to the action plan generation unit 140 (step S206). When the searching is not successful, the process ends. Then, the process of the flowchart ends.

Figure 12:
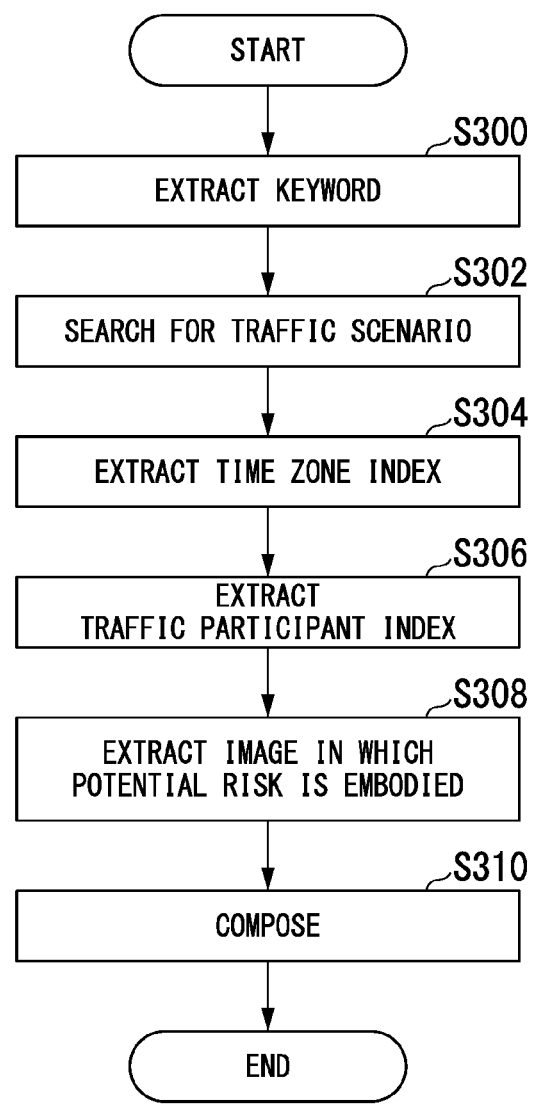
FIG. 12 is a flowchart illustrating an example of a flow of a process of reproducing a potential risk by the risk analysis unit.

FIG. 12 is a flowchart illustrating an example of a flow of a process of reproducing a potential risk by the risk analysis unit 142. For example, the process of the flowchart illustrated in FIG. 12 may be performed at a predetermined period or a predetermined timing repeatedly as in the flowchart of FIG. 11 or may be performed when it is detected that the process of the flowchart of FIG. 11 ends.

The risk analysis unit 142 extracts a keyword related to the risk region from the estimation result output by the potential risk estimation unit 138 (step S300). Subsequently, the risk analysis unit 142 searches the traffic scenario storage unit 150 using the extracted keyword (step S302). Subsequently, the risk analysis unit 142 extracts the search result using the keyword related to the time zone from the search result (step S304) and further extracts the search result extracted using the keyword related to the time zone using the keyword associated with the traffic participants (step S306). Subsequently, the risk analysis unit 142 selects image information in which the potential risk corresponding to an extraction result is embodied (step S308) and composes the extracted result image by composing the image information with the peripheral situation of the own vehicle M recognized by the peripheral situation recognition unit 132 (step S310). Then, the process of the flowchart ends.

When there is no keyword related to the time zone, the process of step S306 of the flowchart illustrated in FIG. 12 may be omitted. Step S304 and step S306 of the flowchart illustrated in FIG. 12 may be performed in reverse order or may be performed simultaneously.

Figure 13:
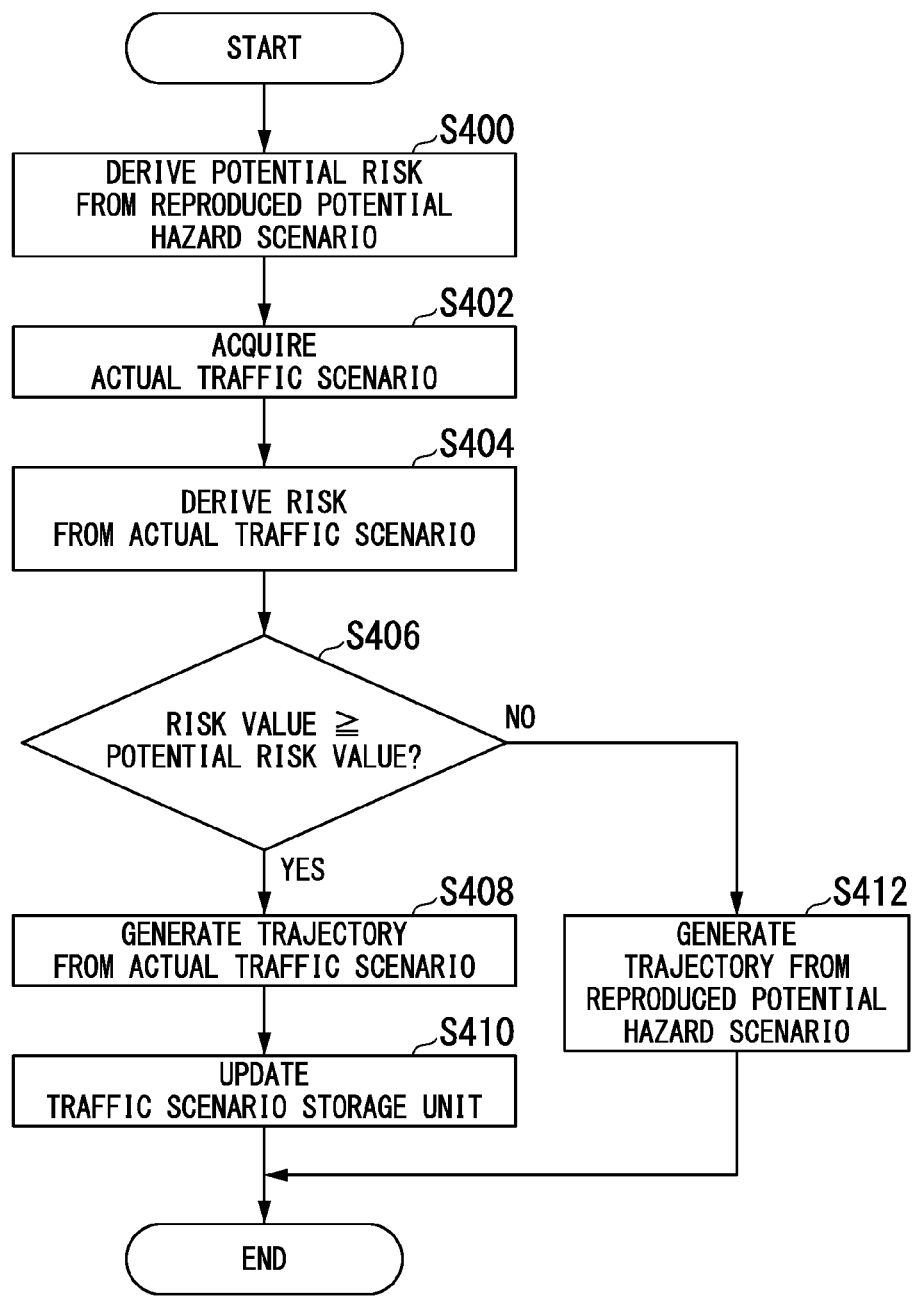
FIG. 13 is a flowchart illustrating an example of a flow of a process of calculating a potential risk by the risk analysis unit.

FIG. 13 is a flowchart illustrating an example of a flow of a process of calculating a potential risk by the risk analysis unit 142. For example, the process of the flowchart illustrated in FIG. 13 may be performed at a predetermined period or a predetermined timing repeatedly as in the flowchart of FIG. 12 or may be performed when it is detected that the process of the flowchart of FIG. 12 ends.

First, the risk analysis unit 142 derives a potential risk value from the potential hazard scenario reproduced by composing the extracted result image (step S400). Subsequently, the risk analysis unit 142 acquires the actual traffic scenario of the own vehicle M (step S402) and derives the risk value (step S404). Subsequently, the risk analysis unit 142 compares the derived risk value with the potential risk value (step S406). When the risk value is equal to or greater than the potential risk value, the risk analysis unit 142 generates the goal trajectory from the actual traffic scenario (step S408) and stores the actual traffic scenario in the traffic scenario storage unit 150 (step S410). When the risk value is less than the potential risk value, the risk analysis unit 142 generates the goal trajectory from the reproduced potential hazard scenario (step S412). Then, the process of the flowchart ends.

As described above, the vehicle control device 1 according to the embodiment includes the peripheral situation recognition unit 132 that recognizes a peripheral situation of the vehicle and the potential risk estimation unit 138 that determines whether there is a potential risk in a traffic scenario associated with a region in which the vehicle and a target are located in a positional relation between the vehicle and the target in accordance with the target recognized by the peripheral situation recognition unit 132 and estimates the potential risk in accordance with the potential risk of the traffic scenario when it is determined that there is the potential risk. It is possible to generate a safer goal trajectory which can correspond to a potential hazard scenario which may not be estimated in an actual traffic scenario.

[Hardware Configuration]

Figure 14:
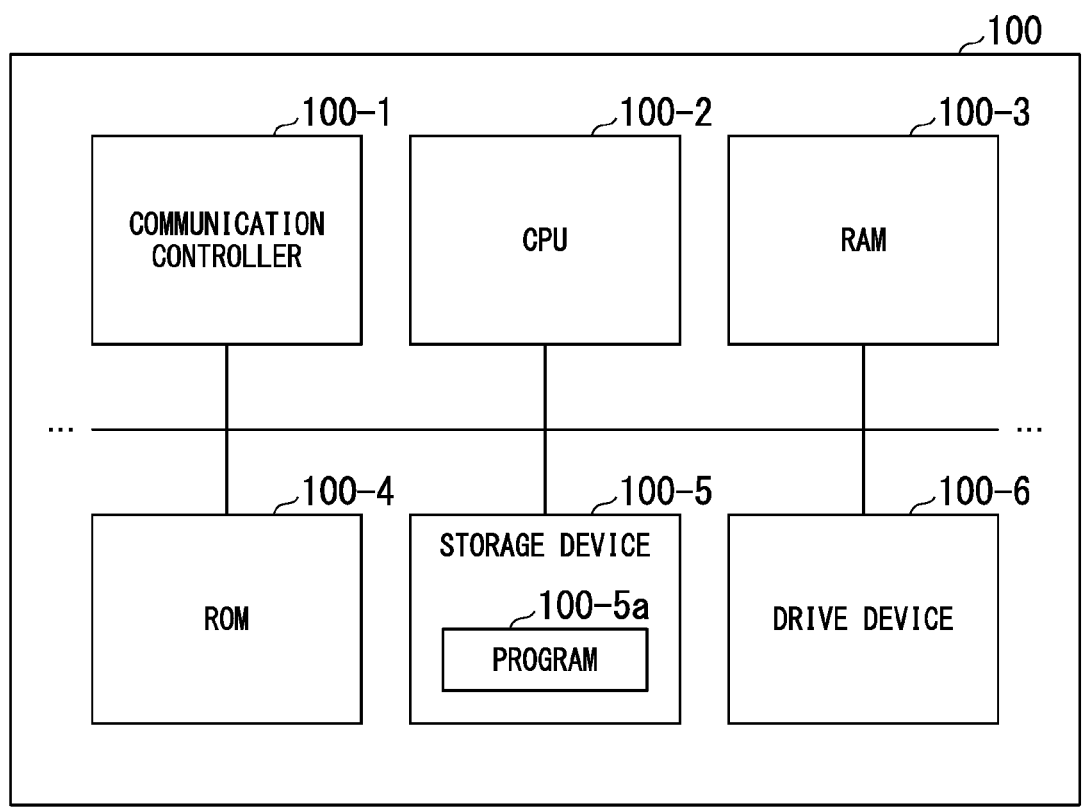
FIG. 14 is a diagram illustrating an example of a hardware configuration of an automatic driving control device according to an embodiment.

FIG. 14 is a diagram illustrating an example of a hardware configuration of the automatic driving control device 100 according to the embodiment. As illustrated, the automatic driving control device 100 is configured such that a communication controller 100-1, a CPU 100-2, a (random access memory) RAM 100-3 that is used as a working memory, a read-only memory (ROM) 100-4 that stores a boot program or the like, a storage device 100-5 such as a flash memory or a hard disk drive (HDD,) a drive device 100-6, and the like are connected to each other via an internal bus or a dedicated communication line. The communication controller 100-1 performs communication with constituent element other than the automatic driving control device 100. The storage device 100-5 stores a program 100-5a that is executed by the CPU 100-2. The program is loaded on the RAM 100-3 by a direct memory access (DMA) controller (not illustrated) to be executed by the CPU 100-2. Thus, one or both of the recognition unit 130 and the action plan generation unit 140 are realized.

The above-described embodiment can be expressed as follows:

the vehicle control device including:

a storage device configured to store a program; and a hardware processor, wherein the hardware processor causes the program stored in the storage device to execute, recognizing a peripheral situation of a vehicle, performing driving control to control one or both of steering and an acceleration or deceleration speed of the vehicle based on the recognized peripheral situation, and estimating presence or absence and classification of a potential risk meeting with an obstacle based on classification of a recognized target and a positional relation between the vehicle and the target and perform the driving control based on an estimation result.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a peripheral situation recognition unit configured to recognize a peripheral situation of a vehicle;
a driving control unit configured to control one or both of steering and acceleration or deceleration of the vehicle based on the peripheral situation recognized by the peripheral situation recognition unit; and
a potential risk estimation unit configured to estimate presence or absence and classification of a potential risk of encountering an obstacle based on classification of a target recognized by the peripheral situation recognition unit and a positional relation between the vehicle and the target,
wherein the driving control unit performs the driving control based on an estimation result of the potential risk estimation unit,
wherein the vehicle control device further comprises:
a risk analysis unit configured to compare a risk value obtained by digitizing a potential risk of the real peripheral situation of the vehicle recognized by the peripheral situation recognition unit with a potential risk value obtained by digitizing a potential risk of the peripheral situation of the vehicle which is reproduced by superimposing information regarding the potential risk to the real peripheral situation recognized by the peripheral situation recognition unit, output a peripheral situation of the vehicle in which the potential risk is considered by the driving control unit when the potential risk value is equal to or greater than the risk value, and output the peripheral situation of the vehicle recognized by the peripheral situation recognition unit to the driving control unit when the potential risk value is less than the risk value.

2. The vehicle control device according to claim 1, further comprising:
a traffic scenario storage unit configured to store the classification of the potential risk included in the estimation result of the potential risk estimation unit by the potential risk estimation unit as a keyword indicating a feature of the estimation result.

3. The vehicle control device according to claim 2, wherein the potential risk estimation unit estimates the presence or absence and the classification of the potential risk by generating the keyword indicating the feature of the estimated potential risk and searching for the estimation result stored in the traffic scenario storage unit by the keyword.

4. The vehicle control device according to claim 1, wherein the risk analysis unit reproduces the peripheral situation of the vehicle in which the potential risk is considered by composing image information related to the potential risk with a recognition result recognized by the peripheral situation recognition unit for display.

5. The vehicle control device according to claim 1, wherein the risk analysis unit reproduces the peripheral situation of the vehicle in which the potential risk is considered by plotting an event indicating an estimation result recognized by the peripheral situation recognition unit in a recognition space.

6. A vehicle control device comprising:
a peripheral situation recognition unit configured to recognize a peripheral situation of a vehicle;
a potential risk estimation unit configured to estimate a potential risk of encountering an obstacle based on a peripheral situation recognized by the peripheral situation recognition unit; and
a driving control unit configured to compare a risk value obtained by digitizing the estimated potential risk of the real peripheral situation of the vehicle recognized by the peripheral situation recognition unit with a potential risk value obtained by digitizing a potential risk of the peripheral situation of the vehicle which is reproduced by superimposing information regarding the potential risk to the real peripheral situation recognized by the peripheral situation recognition unit, perform driving control in which the potential risk is considered when the potential risk value is equal to or greater than the risk value, and perform driving control based on the peripheral situation of the vehicle recognized by the peripheral situation recognition unit when the potential risk value is less than the risk value.

7. A vehicle control method for causing a computer to perform:
recognizing a peripheral situation of a vehicle;
performing driving control to control one or both of steering and acceleration or deceleration of the vehicle based on the recognized peripheral situation;
estimating presence or absence and classification of a potential risk of encountering an obstacle based on classification of a recognized target and a positional relation between the vehicle and the target and performing the driving control based on an estimation result,
comparing a risk value obtained by digitizing a potential risk of the real peripheral situation of the vehicle recognized with a potential risk value obtained by digitizing a potential risk of the peripheral situation of the vehicle which is reproduced by superimposing information regarding the potential risk to the real peripheral situation recognized,
outputting a peripheral situation of the vehicle in which the potential risk is considered when the potential risk value is equal to or greater than the risk value, and
outputting the peripheral situation of the vehicle recognized when the potential risk value is less than the risk value.

8. A storage medium storing a program causing a computer to perform:
recognizing a peripheral situation of a vehicle;
performing driving control to control one or both of steering and acceleration or deceleration of the vehicle based on the recognized peripheral situation;
estimating presence or absence and classification of a potential risk of encountering an obstacle based on classification of a recognized target and a positional relation between the vehicle and the target and performing the driving control based on an estimation result,
comparing a risk value obtained by digitizing a potential risk of the real peripheral situation of the vehicle recognized with a potential risk value obtained by digitizing a potential risk of the peripheral situation of the vehicle which is reproduced by superimposing information regarding the potential risk to the real peripheral situation recognized,
outputting a peripheral situation of the vehicle in which the potential risk is considered when the potential risk value is equal to or greater than the risk value, and
outputting the peripheral situation of the vehicle recognized when the potential risk value is less than the risk value.

* * * * *